Dec. 30, 1969   R. R. ANNAND   3,486,996
CORROSION TEST PROBE
Filed June 16, 1966

INVENTOR.
ROBERT R. ANNAND
BY *Sidney B. Ring*
ATTORNEY

United States Patent Office 3,486,996
Patented Dec. 30, 1969

3,486,996
CORROSION TEST PROBE
Robert R. Annand, St. Louis, Mo., assignor to Petrolite Corporation, Wilmington, Del., a corporation of Delaware
Filed June 16, 1966, Ser. No. 558,124
Int. Cl. B01k 3/04
U.S. Cl. 204—195                                8 Claims

ABSTRACT OF THE DISCLOSURE

A corrosion test probe assembly for determining the corrosion rate of metallic constructional material exposed to a corrodant electrolyte by means of polarization measurements including an elongated test probe body with three separate electrodes of metallic material, one electrode being the test specimen, the second electrode being a reference electrode, and the third electrode being an auxiliary electrode, each of said electrodes being supported in, rather than from, said test probe body, there being separate electrically conductive means connected to said electrodes, and means for insulating said electrodes from each other.

---

This invention relates to the use of an electro-chemical technique in the study of corrosion processes and to instruments employed therein. More particularly, this invention is concerned with correlating the polarization characteristics of metals with the corrosion rate of said metals and most particularly to a probe adapted to instruments employed in such processes which permit an easy and rapid determination of the rates at which metals are corroding in electrolytic solutions.

In application S.N. 332,399 filed Dec. 23, 1963, now U.S. Patent No. 3,406,101, granted on Oct. 16, 1968, there is described a process and apparatus for determining the rate of corrosion.

Therein are the disclosed apparatus and process for rapidly determining the rate of corrosion of a metallic material in a corrodant electrolyte by means of polarization measurements. A corrosion test probe assembly is used therein having three electrodes, each being an individual projection from the probe base.

I have now invented test probes which can be employed in conjunction with the apparatus described in said S.N. 332,399 and other similar instruments and systems employing the principals described in said patent application which is characterized by a probe having three electrodes in one elongated prong projection as contrasted to each electrode being a single prong projection as shown in said S.N. 332,399.

Among other things, this novel probe has the following advantages:

(1) It is exposed to the same hydrodynamic flow conditions as the pipe walls so as to give a truer corrosion reading of the system.

(2) It presents greater resistance to shearing off of the electrodes as might happen in high pressure, high velocity systems such as in drilling mud streams, etc.

(3) It provides flexibility for locating the test electrode: for example, in situations where it is necessary to go through a gate valve or through reducing unions in order to get the test electrode into the stream to be monitored.

(4) It provides ease of manufacture, versatility in use in a wide variety of applications and for various metals, etc.

The probe can be employed to get instantaneous readings in areas which are not too accessible, for example, in deep oil or gas wells, water wells, etc. by lowering the probe, connected to the corrosion meter, into the corrosive system.

Other advantages will be evident from a description of the novel probe. The invention is illustrated by the drawing in which FIGURE 1 is a partial section perspective view of the probe.

Figure 1:
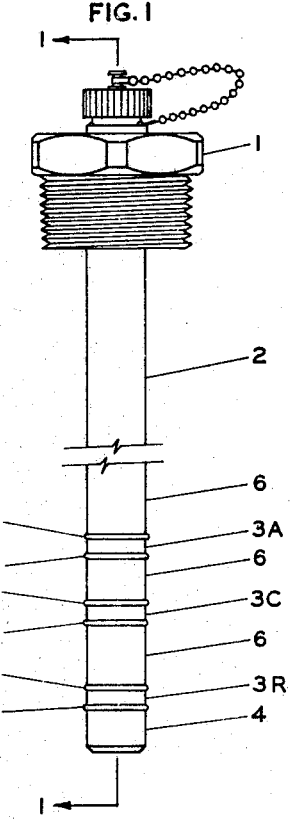

In FIGURE 1, 1 is a top cap which is useful for sealing the top of the probe and for inserting and/or screwing the probe into the corrosive system. 2 is the body of the probe which is generally made of any suitable non-conducting material which will stand up in the corroding system, for example, of plastic, resin, glass, fiber, etc. 3A, 3C and 3R are the electrodes which are in electrical contact with the corrosion meter, for example in the manner of said S.N. 332,399.

In contrast to the probe of said S.N. 332,399 wherein the electrodes are substantially at right angles to the base of the probe, the electrodes of the present invention are within the body of the probe and are substantially parallel to the top cap of the probe. Stated another way, the electrodes are an integral part of an elongated probe instead of being individual projections from the probe base.

Although the order of electrodes may be varied, in this embodiment 3A is the auxiliary electrode, 3C is the test electrode and 3R is the reference electrode and 4 is a bottom cap employed to seal the inside of the probe. To insure a tight seal throughout, O-rings 5 are employed. Intervening between electrodes are non-conductive spacing materials 6, preferably of a laminated phenolic type.

Figure 2:
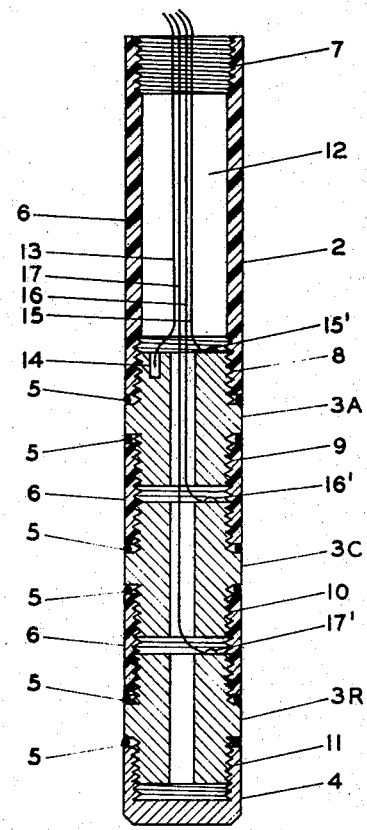
FIGURE 2 is a vertical cross-section along line 1—1 of the probe of FIGURE 1 without the top cap.

FIGURE 2, a vertical cross-section of the probe along line 1—1, illustrates in greater detail the internal arrangement of the probe. The probe is screwed into top cap 1 by means of screw thread 7. The body of the probe 2 contains screw threads 8, 9, 10, 11 into which the electrodes and bottom cap are screwed and O-rings 5 are positioned. Contained within the probe is an annular space 12,, through which three electrical lead lines 15, 16, 17 establish electrical contact between the electrodes and the corrosion meter. These wires are attached at points 15', 16', and 17'. In order to obtain the temperature of the system, a thermocouple 14 is positioned in the probe with electrical connection 13 to a recording device.

Figure 3:
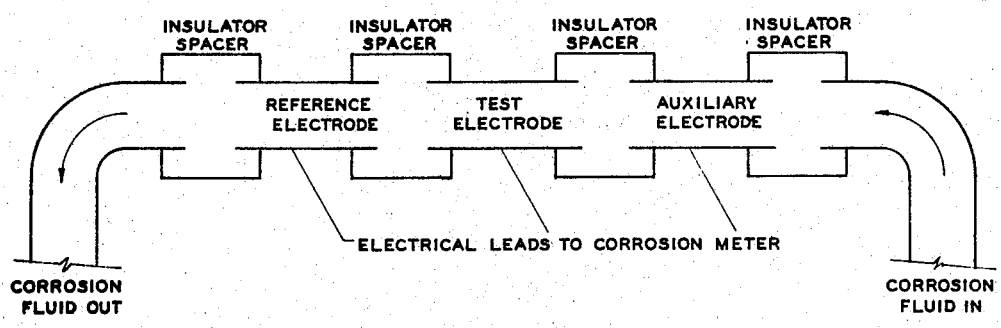
FIGURE 3 is a schematic drawing of the invention wherein the corrosive liquid flows through the probe rather than around it.

Based on the principals described herein other modifications are possible. For example, the probe of this invention can also be modified so that the fluid flows through rather than around the probe so as to more accurately measure the corrosion of the system experiencing a more nearly identical dynamic flow pattern as present in the system itself. This is illustrated in the schematic diagram of FIGURE 3, which shows a flow-through probe. The probe shown in FIGURE 2 can be modified according to this flow-through principal so that the lead wires are protected and the annular space will allow the corrosive fluid to flow through it.

In the preferred construction of the electrodes, all electrodes are made of the same material which is preferably of ferrous metal. For accuracy of measurement, the exposed surface areas of each electrode should remain constant to give accurate and easy readings since corrosion rates are inversely proportional to polarization resistance ($\Delta E/\Delta I$) where $\Delta I$ is actually in units of current density ($\Delta I$/area).

If $\Delta E$ and the exposed surface area of the test specimens are fixed constants, the corrosion rates become directly proportional to the applied current.

The three electrodes are each preferably of identical constructions and made from ferrous metal such as steel. Preferably, the electrodes are of 1020 mild steel, machined to give an apparent exposed surface area of 9.0 square centimeters or 0.090 of a square decimeter since it has been determined, using solutions containing a wide range of salt concentrations, that a steel electrode with 0.090 of a square decimeter exposed to the solution and corroding at a rate of 1 m.d.d. (milligrams per square decimeter per day) requires an average of 1 microamp of external current to obtain 10 millivolts of polarization. This permits the microammeter in the corrosion meter to be calibrated directly in m.d.d., a common unit used to describe corrosion rates. Of course, if desired, electrodes of other sizes and shapes may be used.

Although steel has been proved suitable for use as a reference electrode in the corrosion test probe of the present invention, the theory of the technique indicates that other metals and metal alloys, e.g. aluminum, copper, brass, lead, nickel, titanium, tantallun, zirconium, chromium, and alloys thereof, may be used under similar conditions. The use of a separate steel reference electrode, especially when the cathode is steel, is advantageous, however, in that it permits a short test period, and permits use of high temperatures and pressure. Also, the difficulties normally encountered when taking potential measurements with a metal reference electrode are eliminated by using a test specimen and reference electrode of the same material regardless of the metal used. Neither the anode nor reference electrode needs to be made of steel, or even of the metallic material required for the test electrode but merely need to be conductive. The test electrode must be of a metallic material having polarization characteristics suitable for measuring corrosion.

Except for the unique design of the probe of this invention with its accompanying advantages, test measurements can be made in the manner described in said S.N. 332,399. Stated another way, the corrosion meter described in said patent application or other similar meters can be attached to the electrodes of this unique probe and the rate of corrosion measured accordingly.

Although the invention has been described with reference to a preferred embodiment thereof, it is contemplated that modifications and variations can be made by those skilled in the art in light of this description without departing from the spirit of the invention.

Having thus described my invention what I claim as new and desire to obtain by Letters Patent is

1. A corrosion test probe assembly for determining the rate of corrosion of a metallic material in a corrodant by means of polarization measurements consisting essentially of
   (1) an elongated test probe body,
   (2) three essentially identical separate electrodes, each having an exposed surface area of about 9 square centimeters, of metallic material consisting of a test specimen electrode, a reference electrode and a third electrode, said three separate electrodes being supported in said elongated test probe body and not being individual projections from the base portion of said probe body,
   (3) separate electrically conductive means connected, respectively, to said test specimen electrode, said reference electrode and said third electrode, and
   (4) means for insulating said electrodes from each other.
2. The corrosion test probe assembly of claim 1 where the electrodes are all made of ferrous metals.
3. The corrosion test probe of claim 2 where the electrodes are annular.
4. The corrosion test probe assembly of claim 1 where the electrodes are all made of brass.
5. The corrosion test probe of claim 4 where the electrodes are annular.
6. The corrosion test probe of claim 1 having a hollow space through which the corroding fluid is capable of flowing.
7. The corrosion test probe of claim 6 where the electrodes are annular.
8. The corrosion test probe of claim 1 where the electrodes are annular.

References Cited
UNITED STATES PATENTS

| | | | |
|---|---|---|---|
| 2,280,075 | 4/1942 | Hayward | 324—30 |
| 2,611,643 | 9/1952 | Higgins | 324—65 |
| 2,851,654 | 9/1958 | Haddad | 204—195 |
| 2,947,679 | 8/1960 | Schaschl et al. | 204—195 |
| 3,098,801 | 7/1963 | Marsh et al. | 204—195 |
| 3,374,672 | 3/1968 | Horne | 324—30 |

T. TUNG, Primary Examiner

U.S. Cl. X.R.

204—272, 286; 324—71